Aug. 16, 1949.                J. IMRE                2,478,923
MULTIPLE CIRCUIT CONTROL SWITCH
Filed Feb. 3, 1945

INVENTOR.
JOHN IMRE
BY
Murray O. Hayes

Patented Aug. 16, 1949

2,478,923

UNITED STATES PATENT OFFICE 2,478,923

MULTIPLE CIRCUIT CONTROL SWITCH

John Imre, Philadelphia, Pa.

Application February 3, 1945, Serial No. 576,108

9 Claims. (Cl. 200—157)

(Granted under the act of March 3, 1883, as amended April 30, 1928; 370 O. G. 757)

This invention relates to new and useful improvements in multiple circuit control switches, and more particularly to electrical switch devices of the plural contact, selective action, trigger actuated type especially adapted for use in aircraft for the remote control of pilotless aircraft by radio.

At the present time, the operation and control of pilotless aircraft by means of radio may be accomplished effectively by the use of four selectively controlled radio circuits that operate through suitable relays to actuate appropriate mechanisms causing the plane to ascend, descend, turn right and turn left, respectively. In addition to these principal radio and associated relay circuits, it is necessary, of course, that the plane assume a forward or other selected straight course of flight after making a right or left turn, and this may be accomplished by interconnecting both the right and left turn relay circuits simultaneously thereby centering the right and left hand steering mechanisms and causing the plane to cease turning and assume a selected straight course of flight.

The flight of one or more pilotless aircraft may be accomplished by remote control, for example, by a pilot in another plane that carries radio transmitting equipment operable, in response to energization of a selected one of the several relay control circuits in the control plane, to energize a selected radio receiving circuit in the pilotless plane that in turn energizes certain relay controlled circuits which cause the pilotless plane or planes to assume a selected direction of flight.

It is desirable that the selective energization of the several control circuits by the pilot in the control plane be made as simplified as possible and be readily accessible to the pilot without releasing his grasp of the control stick of the plane. The location most readily accessible to the pilot of the control plane, of course, is the main control stick of the plane and, because of the limited space available and in order to provide maximum simplification and ease of control of the several directional control circuits, it is substantially essential that such a selective control switch be embodied in a single, composite switch construction.

Therefore, and with the foregoing premises in mind, the principle of the object of the present invention is to provide a novel electrical switch construction and assembly of the plural contact, selective action, trigger actuated type that may be employed to control selectively the energization of the several relay and associated radio transmitting circuits in the control plane and thereby activate correspondingly tuned radio receiving circuits in a remote pilotless aircraft to cause the latter to travel in the direction selected by operation of such switch by the pilot in said control plane.

Another object of the present invention is to provide an electrical switch of the character set forth that may be mounted internally of the handle of the control stick in the control plane where it is readily accessible to the pilot thereof.

Another object of the invention is to provide an electrical switch of the type described that may be readily and easily actuated by the pilot of the control plane while grasping the control stick handle of the plane in the usual manner.

A further object of the present invention is to provide an electrical switch, having the stated characteristics, that is constructed and arranged so as to fit readily and easily into the control stick handle of a plane as produced commercially and without modification or machining thereof.

A still further object of the invention is to provide an electrical switch as set forth that is relatively simplified in construction, and highly efficient and fool-proof in operation.

These and other objects of the invention, and the various features and details of the construction and operation thereof are hereinafter fully set forth and described with reference to the accompanying drawing, in which.

Figure 1:
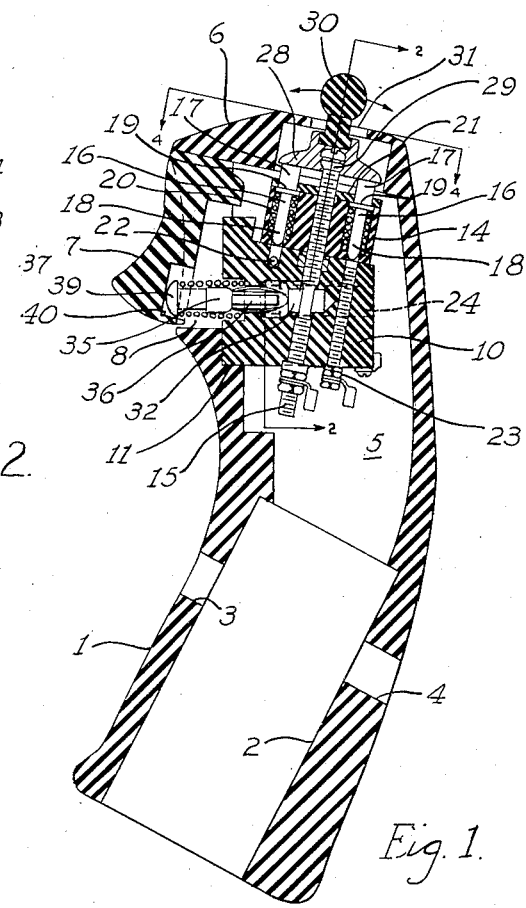
Fig. 1 is a vertical sectional view showing a switch embodying the present invention mounted internally of the handle of the control stick of an airplane.

Referring now to the drawing and particularly to Fig. 1 thereof, reference numeral 1 designates generally one commercial form of airplane control stick handle. This handle 1 may be of molded plastic composition, and is provided at its lower end with an inwardly extending recess or socket 2 adapted to receive the upper end of the main control stick of a plane, the latter being secured in said handle socket 2 by means of a suitable lock screw or the like (not shown) that extends through aligned openings 3 and 4 provided in the handle 1.

As shown in the drawing, the upper portion of the handle 1 likewise is provided with a cavity 5 of predetermined configuration that communicates at its lower end with the upper end of the control stick socket 2, and has its upper end normally closed by means of a removable cap or cover member that is removed and replaced by a cover or cap 6 having the construction shown in the drawing. A trigger element 7 is pivotally mounted in a slot or opening 8 provided in the front of the handle 1 at the top thereof, and originally and normally intended to be operated to fire the machine guns carried by the plane.

According to the present invention there is mounted within the upper cavity 5 of the handle 1 a plural contact, selective action, trigger actuated electrical switch embodying the present invention and operable by the pilot of the plane to remotely control by radio the flight of one or more pilotless aircraft.

More particularly, a switch constructed in accordance with the present invention may comprise a main block or body portion 10 of molded fibrous or other di-electric material. The forward bottom edge portion of the switch body 10 is constructed and arranged to seat upon a shoulder portion 11 provided in the handle cavity 5 and the body 10 is further supported and predeterminedly positioned within said cavity by means of lugs 12 that are formed integral with said body and project laterally from the opposite rear edge portions thereof into grooves or keyways 13 that extend downwardly in the sidewalls of the handle cavity 5 from the upper edge thereof (see Fig. 3). The shoulder portion 11 and grooves 13 are provided in the handle 1 as initially manufactured, and by properly dimensioning the switch body 10 and providing the lugs 12 thereon to engage, respectively, the shoulder 11 and grooves 13 in the handle, the switch may be firmly and securely fitted within the handle cavity 5 in the relation shown in the drawing.

As best shown in Fig. 1 of the drawing, the major portion of the upper surface of the switch body 10 is disposed in a rearwardly declining or sloping plane, and surmounting this surface is a pin block or the like 14 that is secured in position upon the body 10 by means of a screw element 15 that is threaded entirely through the pin block 14 and the switch body member 10. The screw 15 extends through the pin block 14 centrally thereof, and mounted in said block 14 circumferentially of the screw 15 at 90° intervals thereabout are front, rear and side contact pins 16, each comprising upper head and lower shank portions 17 and 18 with an enlarged shoulder or flange portion 19 therebetween.

The contact pins 16, are each biased in an upward direction (with reference to the drawing) by means of a spring or the like 20, and are retained against displacement from the block 14 by means of a plate or the like 21 that overlies the upper surface of said block 14 and is adapted to be engaged by the pin shoulders 19. The springs 20 surround the shank portions 18 of the pins 16 and act between the underface of the pin shoulders 19 and an inwardly projecting flange portion at the bottom of the block 14, to normally maintain each pin 16 in its uppermost position with its shoulder 19 engaging the underside of plate 21 and its head 17 projecting upwardly therethrough as illustrated.

The several contact pins 16 are adapted to be selectively and individually depressed against the action of their springs 20 so that their shank portions 18 enter the switch main body 10, through appropriate openings provided therein, and make electrical contact with a cooperatively positioned or associated terminal element in the switch body 10. Thus the shank portion 18 of the front pin 16 when depressed makes electrical contact with a terminal element 22 positioned horizontally in the switch body 10 and having connected thereto, for example, the electrical lead conductor (not shown) to the relay circuit controlling the descent or dive of a radio controlled pilotless plane. Similarly, depression of the rear pin 16 causes its shank 18 to make electrical contact with a terminal element 23 that is threaded upwardly into the switch block 10 and may have connected thereto the electrical lead conductor (not shown) to the relay circuit that controls rise or ascent of the pilotless plane.

Figure 2:
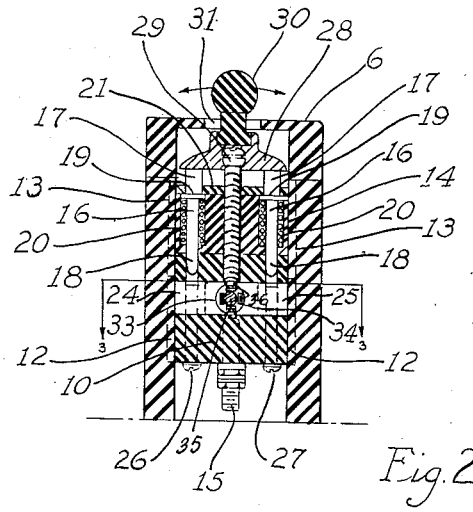
Fig. 2 is a sectional view taken on line 2—2, Fig. 1.

On the other hand, and referring more particularly to Fig. 2 of the drawing, depression of the side or lateral pins 16 engages their shank portions 18 with one or the other of a pair of terminal blocks 24 and 25, respectively, that are mounted in suitable recesses in opposite sides of the switch body 10 and secured therein by means of screws or the like 26 and 27 that serve also as terminals for the connection, for example, of the lead conductors (not shown) to the relay circuits controlling right and left hand direction of flight, respectively, of the remotely controlled pilotless aircraft.

Selective depression of the contact pins 16 as aforesaid, may be accomplished by means of a common actuator 28 of circular configuration that overlies all of the heads 17 of said pins and is mounted upon the central screw element 15 at the upper end thereof. A universal joint connection 29 is provided between the screw 15 and actuator 28 to permit the latter to be tilted or actuated angularly with respect to the screw 15 and thereby depress a selected one of the pins 16. Actuation of the actuator 28 may be affected by means of an element 30 secured in said actuator and projecting outwardly through an opening 31 in the cap or cover member 6 of the control stick handle 1.

Figure 4:
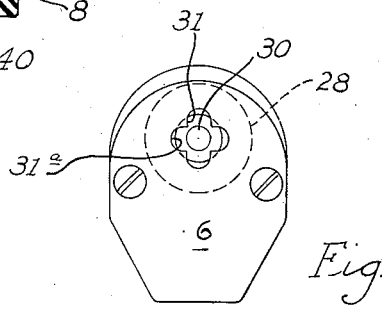
Fig. 4 is a sectional view taken on line 4—4, Fig. 1.

As shown in Fig. 4 of the drawing, the opening 30 in the handle cover 6 is provided with radially extending arcuate slots 31ᵃ arranged 90° apart and positioned to correspond with the positions of the pins 16 radially with respect to the screw 15 to receive and provide clearance for the stem of the element 30 when the latter is actuated forwardly, rearwardly, or to the right or left to cause the actuator 28 to depress the correspondingly positioned underlying contact pin 16. The provision and arrangement of the slots 31 is such as to permit the element 30 and actuator 28 to be moved in any one of the four directions defined thereby with the result that only one of said contact pins 16 may be depressed at a time.

In the application of the switch of the present invention to the remote control of radio operated pilotless aircraft as hereinbefore described, the lower projecting end of the central screw member 15 may have connected thereto one lead conductor (not shown) from a suitable source of electrical potential with the result that when a selected contact pin 16 is depressed by actuation of the element 30 in the appropriate direction, an electric circuit is completed from the source of electric current through the screw 15, the actuator 28, the selected pin 16 and the associated switch terminal 22, 23, 24 or 25, as the case may be, depending upon which particular pin 16 is depressed.

In addition to the foregoing features of construction and operation, there is provided, in the front face of the switch body 10, a bore 32 of circular cross-sectional shape that extends inwardly of the body 10 intermediate the terminal blocks 24 and 25 with its axis parallel to and coplanar with the long axes of said blocks 24 and 25. The bore 32 extends inwardly of the body 10 a short distance beyond the screw member 15 and the latter, therefore, passes through the said bore 32 as shown in the drawing. The portion of the screw 15 residing within the bore 32 preferably is of reduced diameter and not threaded, as indicated.

Figure 3:
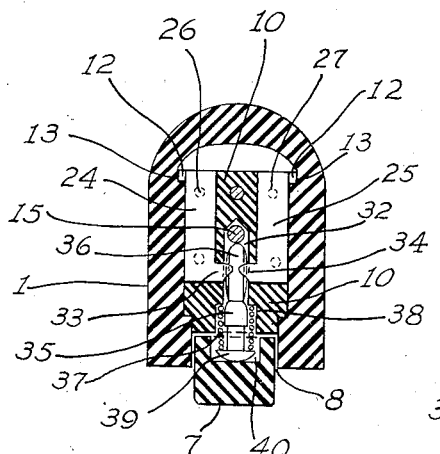
Fig. 3 is a sectional view taken on line 3—3, Fig. 2.

As best illustrated in Fig. 3 of the drawing, the terminal blocks 24 and 25 are provided at their forward end with inwardly projecting leg portions 33 and 34, respectively, that extend at right angles to the main body portion of said blocks 24 and 25 and protrude into the bore 32 from opposite sides thereof in the relation shown. The adjacent free ends of these terminal block leg portions 33 and 34 are disposed in spaced relation with respect to each other and provided, respectively, with oppositely facing concave end faces that cooperate to provide within the bore 32 a throat or passage of less diameter than the bore 32. The adjacent ends of the leg portions 33 and 34 are spaced apart as aforesaid in order that the control circuits connected to each terminal block 24 and 25 normally will be electrically independent of each other and normally responsive only to the depression of the contact pin 16 that is associated with each particular block.

However, the circuits connected respectively to the blocks 24 and 25, and energized by selective depression of the side pins 16 associated therewith, may be utilized in the illustrated application of the present invention to control right or left directional flight of the radio controlled pilotless aircraft, and after one or the other of these circuits has been activated from the control plane to cause the radio controlled plane to make a right or left hand turn as the case may be, it is necessary that the controlled plane assume a forward or other selected straight course of flight. This may be accomplished, as aforesaid, by interconnecting both the right and left turn circuits simultaneously to center the controlled steering mechanisms and thereby cause the plane to cease turning and assume a selected straight course of flight.

In the embodiment of the switch of the present invention herein illustrated and described, electrical interconnection of both the right and left turn control circuits with one another and with the source of electrical potential connected to the central screw 15, may be accomplished by means of a plunger 35 that is mounted in the bore 32 and arranged to be actuated inwardly thereof into electrical contact with the screw 15 and the leg portions 33 and 34 of the blocks 24 and 25 as shown in Fig. 3 of the drawing, the inner end or nose of the shank portion of the plunger 35 engaging the said screw 15, and the leg portions 33 and 34 of said blocks being engaged laterally by the plunger shank which is composed of a plurality of outwardly bowed resilient elements 36.

The plunger 35 normally is urged outwardly of the bore 32, and hence out of electrical contact with screw 15 and the block legs 33 and 34, by means of a spring or the like 37 that surrounds said plunger and acts between a counterbored shoulder portion 38 in the body 10 and the enlarged head 39 of the plunger 35, to exert an outward force on the latter. The head 39 of the plunger 35 resides within a socket or recess 40 in the handle trigger 7, and inward actuation of the plunger 35 to interconnect both right and left turn control circuits with the source of electrical potential as previously described may be accomplished by the pilot merely by actuation of the handle trigger 7 with his forefinger, the said spring 37 operating to return said plunger 35 and trigger 7 outwardly to their normal positions upon release of pressure upon the trigger.

From the foregoing description it will be observed that the present invention provides a novel electrical switch assembly of the plural contact, selective action type that may be mounted internally of the handle of the control stick of a plane where it is readily accessible and easily operated by the pilot without releasing his grasp upon the control stick handle. Furthermore, the switch of the present invention is of relatively simplified construction, and highly efficient and fool-proof in operation.

While a particular embodiment of the switch and assembly has been illustrated and described herein, it is not intended that the invention be limited to such disclosure but that modification and changes may be incorporated and made therein within the scope of the claims.

The invention described herein may be manufactured and used by or for the Government of the United States of America for governmental purposes without the payment of any royalties thereon or therefor.

I claim:

1. An electrical switch assembly, comprising: a plurality of terminal elements; a plurality of spring loaded contact pins; stationary contact members mounted for engagement by said pins, respectively, and connected to said elements, respectively; means for actuating any one of said pins against the force of the associated spring into engagement with its associated contact; means cooperable with said actuating means to prevent actuation of more than one of said pins at a time; and plunger means actuable independently of said actuating means and having a contact member engageable with a predetermined pair of said contact members to electrically interconnect the elements associated with said pair.

2. An electrical switch comprising a body member; a plurality of terminal elements in said body member electrically insulated from each other, a pin block surmounting said body member, a plurality of contact pins carried by said block each arranged for engagement with one of said elements, means normally biasing said pins out of engagement with said elements, common means for actuating any one of said pins into engagement with its associated element, means cooperable with said actuating means to prevent actuation of more than one of said pins at a time, and plunger means actuable inwardly of said body member independently of said actuating means, said plunger means having means to electrically interconnect a predetermined pair of said elements.

3. An electrical switch assembly comprising a hollow handle member for the control stick of an aircraft, a plurality of terminal elements positioned in the hollow each adapted to be connected to an electrical circuit, a plurality of spring loaded contact pins each arranged for actuation into engagement with one of said elements, common actuating means for said pins including an actuating member projecting outwardly through said handle member, said handle member having means thereon to prevent actuation of more than one of said pins at a time, a spring loaded plunger element actuable independently of said actuating means and having means thereon for electrically interconnecting a predetermined pair of said terminal elements, and trigger means pivotally carried by said handle member for actuating said plunger element.

4. In a control stick assembly, a removably mounted hollow grip portion, a plurality of terminal elements positioned in the hollow each adapted to be connected in an electrical circuit, a selective switch mounted in the hollow and having means for contacting each of said elements, means extending through the top of said portion for actuating said switch, an auxiliary switch in said portion having movable conducting means engageable with at least a pair of said elements, and a trigger extending through the front of said portion for actuating said auxiliary switch.

5. In a control stick assembly, a removably mounted hollow grip handle for said stick, a multiple switch mounted in said hollow having a common contact and a plurality of circuit contacts each adapted to be connected to an electrical circuit, a toggle lever extending through the top of said handle for operating said switch selectively to connect said common contact with any one of said circuit contacts, an auxiliary switch having a movable conductor engageable with two of said circuit contacts to thereby neutralize the selectivity of said multiple switch with respect to said two contacts, and a trigger lever extending through the front of said handle for operating said auxiliary switch.

6. In a control stick assembly, a removably mounted hollow grip handle for said stick, a multiple switch mounted in said hollow having a common contact and a plurality of circuit contacts each adapted to be connected to an electrical circuit, a toggle lever extending through the top of said handle for operating said switch selectively to connect said common contact with any one of said circuit contacts, a cooperating switch having a movable conductor engageable with said common contact and at least two of said circuit contacts to thereby neutralize the selectivity of said multiple switch.

7. In a control stick assembly, a removably mounted hollow grip member, a plurality of terminal elements therein each adapted to be connected to an electrical circuit, a multiple switch in said member for selectively connecting any one of said elements to a source of electrical energy, and a switch having movable conducting means engageable with at least two of said elements to thereby at least partially neutralize the selectivity of said multiple switch.

8. An electrical switch assembly comprising a housing, a plurality of terminal elements therein each adapted to be connected to an electrical circuit, a multiple switch in said housing having a plurality of contacts and means for selectively connecting any one of said contacts to a respective one of said elements, and a switch having movable conducting means engageable with at least two of said contacts to thereby at least partially neutralize the selectivity of said multiple switch.

9. An electrical switch assembly comprising a housing, a plurality of terminal elements therein each adapted to be connected to an electrical circuit, a multiple switch in said housing having a plurality of contacts, one for each of said elements, and means for selectively connecting any one of said contacts to its respective element, and a switch having movable conducting means engageable with at least two of said elements to thereby at least partially neutralize the selectivity of said multiple switch.

JOHN IMRE.

REFERENCES CITED

The following references are of record in the file of this patent:

UNITED STATES PATENTS

| Number | Name | Date |
|---|---|---|
| 1,124,678 | Varney | Jan. 12, 1915 |
| 1,335,753 | Riggs | Apr. 6, 1920 |
| 1,721,420 | Sturner | July 16, 1929 |
| 1,886,519 | Bobroff | Nov. 8, 1932 |
| 1,995,671 | Dashner | Mar. 26, 1935 |
| 2,330,646 | Voigt et al. | Sept. 28, 1943 |
| 2,326,232 | Krieger | Aug. 10, 1943 |
| 2,374,868 | Krieger | May 1, 1945 |
| 2,390,846 | Obszarny | Dec. 11, 1945 |

FOREIGN PATENTS

| Number | Country | Date |
|---|---|---|
| 267,674 | Great Britain | Mar. 24, 1927 |